(12) United States Patent
Laursen

(10) Patent No.: US 7,637,771 B2
(45) Date of Patent: Dec. 29, 2009

(54) CABLE SLACK MANAGER SYSTEM AND METHOD

(75) Inventor: Erik Laursen, Kirkland, WA (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

(21) Appl. No.: 12/197,785

(22) Filed: Aug. 25, 2008

(65) Prior Publication Data

US 2008/0311786 A1 Dec. 18, 2008

Related U.S. Application Data

(63) Continuation of application No. 11/337,177, filed on Jan. 20, 2006, now Pat. No. 7,431,610.

(60) Provisional application No. 60/646,320, filed on Jan. 21, 2005.

(51) Int. Cl.
*A47F 7/00* (2006.01)
(52) U.S. Cl. .................. 439/501; 211/26; 312/223.6
(58) Field of Classification Search ............. 439/501, 439/546; 211/26, 85.5; 312/223.6
See application file for complete search history.

(56) References Cited

U.S. PATENT DOCUMENTS

| | | | |
|---|---|---|---|
| 1,723,471 A | 8/1929 | Dunham | |
| 2,734,994 A | 2/1956 | Fuqua | |
| 3,047,829 A | 7/1962 | Mouat | |
| 4,029,953 A | 6/1977 | Natoli | |
| 4,424,553 A | 1/1984 | Marsocci et al. | |
| 5,338,226 A | 8/1994 | Bryce et al. | |
| 5,772,469 A | 6/1998 | Polger et al. | |
| 7,472,970 B2 * | 1/2009 | Bergesch et al. | 312/223.1 |
| 2004/0094491 A1 | 5/2004 | Smith et al. | |
| 2006/0237277 A1 | 10/2006 | Bohan | |

* cited by examiner

*Primary Examiner*—Gary F. Paumen
(74) *Attorney, Agent, or Firm*—Davis Wright Tremaine LLP; George C. Rondeau, Jr.; Heather M. Colburn

(57) ABSTRACT

A cable slack management system is used in conjunction with a conventional component rack to secure cables of excess length to minimize disturbance, interference, and general clutter that the excess cable length would otherwise cause. In one implementation, the cable slack management system includes a slack management panel that is attached to two opposing vertical members of a rack to extend horizontally between the members as a cross-member of the rack. If more than one cable slack management system is installed in a rack, typically the slack management panels are placed between component panels in some alternating fashion. In an alternative implementation, the slack management panels are vertically oriented, and are typically mounted adjacent to a rack. The cable slack management system also includes one or more cable spools for each slack management panel. The cable spools allow cable to be wrapped around them thereby securing the cable.

34 Claims, 8 Drawing Sheets

CABLE SLACK MANAGER SYSTEM AND METHOD

CROSS REFERENCE TO RELATED APPLICATIONS

This application is a continuation application of pending U.S. Ser. No. 11/337,177, filed Jan. 20, 2006, which claims priority benefit of provisional application Ser. No. 60/646,320, filed Jan. 21, 2005. The contents of all the above applications are incorporated herein by reference in their entirety.

BACKGROUND OF THE INVENTION

1. Field of the Invention

The present invention relates generally to the field of equipment racks, and more particularly to the field of cable management associated with such racks.

2. Description of the Related Art

Racks, frames, cabinets and the like (referred to generally herein as "racks") support computer and other electronic equipment and doors and panels (referred to generally herein as "components"). The racks and the components are mutually sized to accommodate placement of the components within the racks. Racks can include vertical members generally spaced a selected standardized distance from one another and cross-members extending between the vertical members. Both the vertical members and the cross-members can have attachment points where the components are secured. These attachment points can include holes to receive bolts, which may be used along with nuts for securing the components.

The racks are typically positioned so that a side of the rack (referred to generally herein as the "backside") is either against a wall of a room or against the backside of another rack. The side of a subject rack opposite its backside (referred to generally herein as the "front side") can provide access to the components supported by the rack since the front side of the rack generally faces outward into a room away from a wall or away from another rack that is adjacent to the subject rack. The components can include patch panels and equipment face panels extending between the vertical members along the front side of the rack. These panels can have slots and other openings for mounting of patch blocks of connectors or other devices or to allow access of control portions of the components from the front side of the racks. The panels are generally securely fastened to the vertical members of the racks.

The components within the racks are typically connected to other components either in the same rack or another rack or are connected to other devices not in a rack for such purposes as control, communication, and power. These connections are made by cables, cords, or other sorts of wires (referred to generally wherein as "cables"), which are generally available in standard lengths. For some applications, many standard lengths of cable may be available, however, a few selected lengths may actually be used in the field so that, for instance, the cables can be purchased in mass quantities. For other applications, selection of cable length may be limited. Consequently, cables may be used at times which are longer than needed and the excess cable length can clutter and interfere with operation and maintenance of the components, racks, and other devices in the vicinity of the racks.

BRIEF DESCRIPTION OF THE SEVERAL VIEWS OF THE DRAWING(S)

DETAILED DESCRIPTION OF THE INVENTION

A cable slack management system according to the present invention is used in conjunction with a conventional component rack to secure cables of excess length to minimize disturbance, interference, and general clutter that the excess length would otherwise cause.

In one implementation, the cable slack management system includes a slack management panel that is attached to two opposing vertical members to extend horizontally between the members. Either the two opposing vertical members are on the front side of the rack or the two opposing members are on the backside of the rack, although typically the two members are on the front side of the rack. The slack management panel is typically located in the rack so that the slack management panel is between two component panels. If more than one cable slack management system is installed in a rack, typically the slack management panels are placed between component panels in an alternating fashion. In an alternative implementation, the slack management panels are vertically oriented, and are typically mounted to a rack while standing beside the rack.

The cable slack management system also includes one or more cable spools for each slack management panel. The cable spools allow cable to be wrapped around them thereby securing the cable. The cable spools are typically cylindrical but can have another shape with another cross-section such as an ellipsoid or rectangular cross-section.

Each of the cable spools generally has a longitudinal axis. The cable spool is attached to the slack management panel so that the longitudinal axis extends substantially away from the rack and the slack management panel. The cable spools can be fixedly attached to the panels such as by welding or removably attached to the panels as further described below. Typically, the slack management panel would have coupling locations for several cable spools so that one or more cable spools can be attached to the slack management panel. In the field, a particular slack management panel may have only one cable spool attached or may have any other number up to its full capacity of cable spools attached, depending upon such factors as the amount of excess cable that must be managed.

Figure 1:
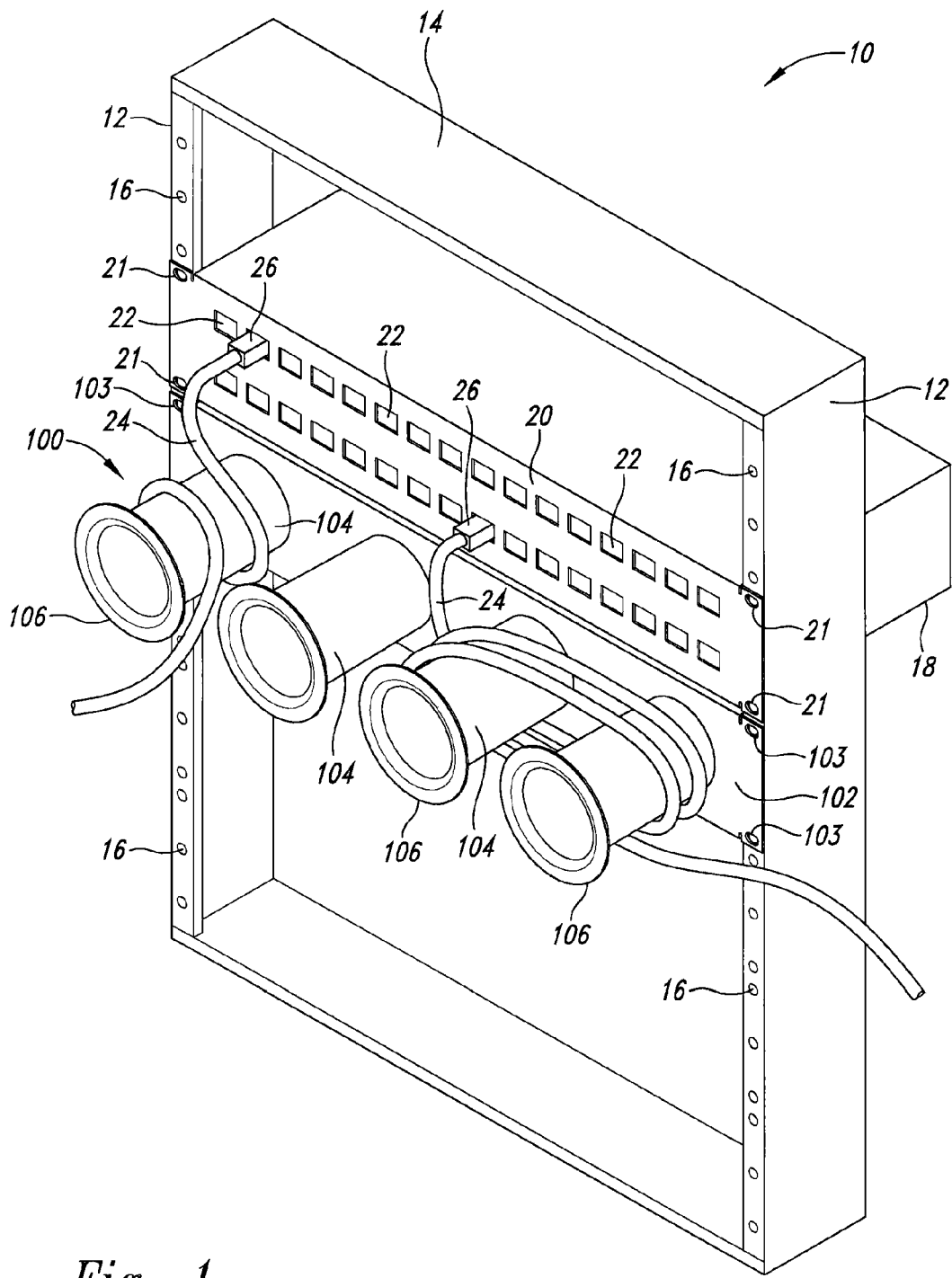
FIG. 1 is an isometric diagram illustrating an implementation of a cable slack manager system attached to a conventional component rack.

A conventional rack 10 having opposing vertical members 12 and horizontal members 14 extending therebetween is shown in FIG. 1. The vertical members 12 have threaded holes 16 to receive bolts (not shown) to attach panels and components to the rack 10. A conventional component 18 is shown having a front panel 20 with holes 21 for bolting of the component panel to the vertical members 12 via the holes 16 of the vertical members. The conventional component 18 has sockets 22 to which conventional cables 24 having plugs 26 are connected.

An implementation of a cable slack management system 100 according to the present invention is shown in FIG. 1 as having a slack management panel 102. The slack management panel 102 has holes 103 for bolting of the slack management panel to the rack 10 through the holes 16 of the vertical members 12 so that the slack management panel extends horizontally between the vertical members of the rack. As shown, the slack management panel 102 is attached to the front side of the rack 10 adjacent to the component panel 20.

The cable slack management system 100 further includes one or more cable spools 104 (four cable spools are shown) attached to the slack management panel 102. The capacity of the slack management panel 102 to support a particular number of the cable spools 104 is dependent upon the size of the cable spools, the size of the slack management panel, and the desired spacing between the cable spools. Spacing between the cable spools 104 is partially dependent upon the desired length of cable that each of the cable spools can manage.

The depicted cable spools 104 are cylindrical, each having a rim portion 106 at the end of the cable spool spaced away from the slack management panel end. The rim portion 106 assists in preventing the cables 24 from sliding off of the cable spools 104. The cable spools 104 are attached to the slack management panel 102 so that the cable spools extend away from the slack management panel to provide ready access to the cable spools for wrapping the cables 24 around one or more of the cable spools.

Figure 2:
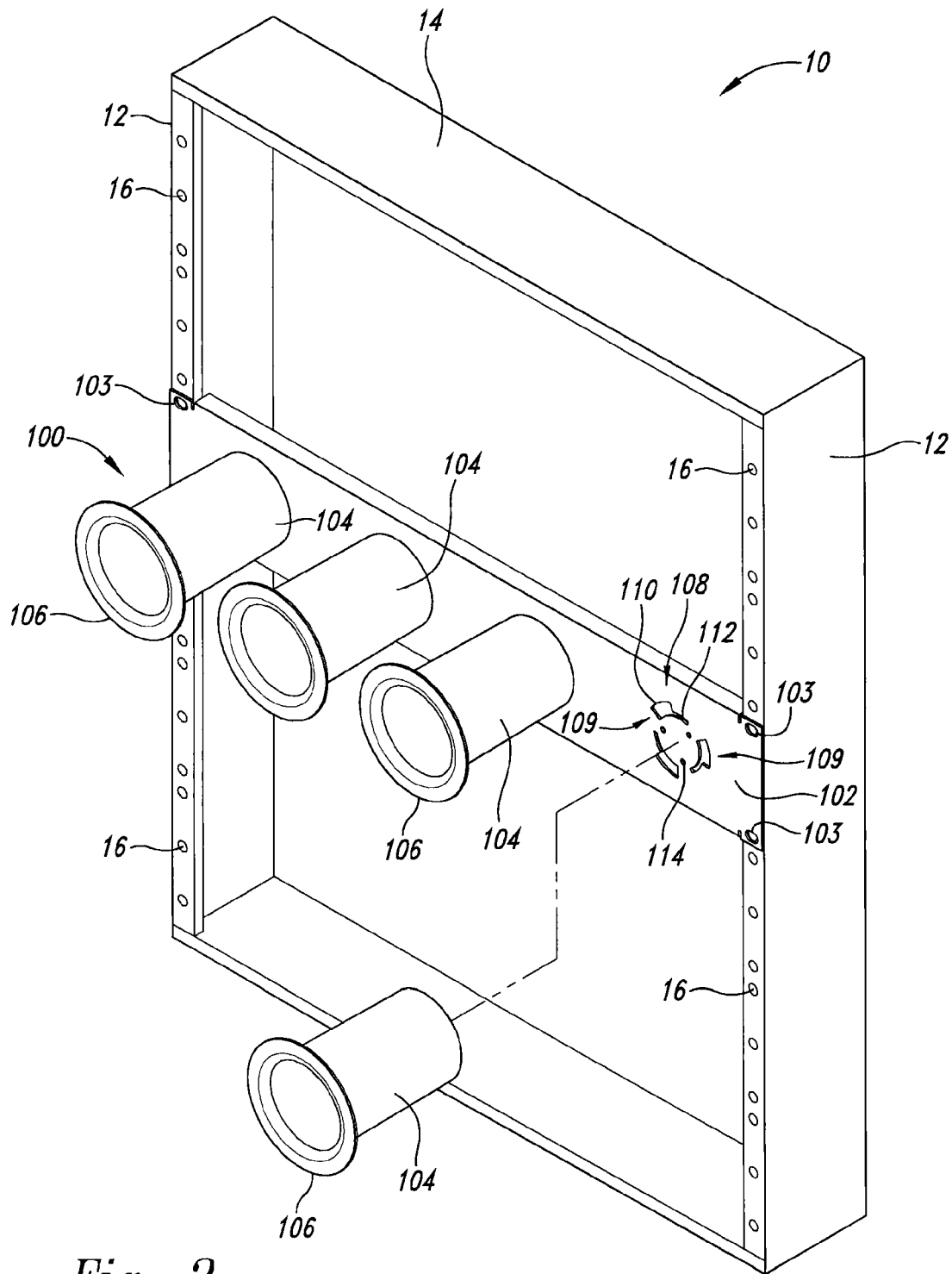
FIG. 2 is an isometric diagram illustrating the cable slack manager system of FIG. 1 with one of the cable spools of the cable slack manager system removed.

One of the cable spools 104 is shown in FIG. 2 as being removed from the slack management panel 102 to reveal a coupling location 108 on the slack management panel. There is one coupling location 108 on the slack management panel 102 for each one of the cable spools 104 that can be potentially attached to the slack management panel. In other words, the capacity of the slack management panel 102 in terms of the number of cable spools 104 that can be attached to the slack management panel is the number of the coupling locations 108 on the slack management panel. For instance, in the depicted implementation, the slack management panel 102 has four coupling locations 108 and thus has a capacity to potentially have four of the cable spools 104 attached to the slack management panel. Each of the coupling locations 108 have a plurality of slots 109 (three shown in FIG. 2) to assist in coupling the cable spool 104 to the slack management panel 102. Each slot 109 includes a receiving portion 110 and a coupling portion 112. Associated with each slot 109 is also a hole 114 whose function is described below.

Figure 3:
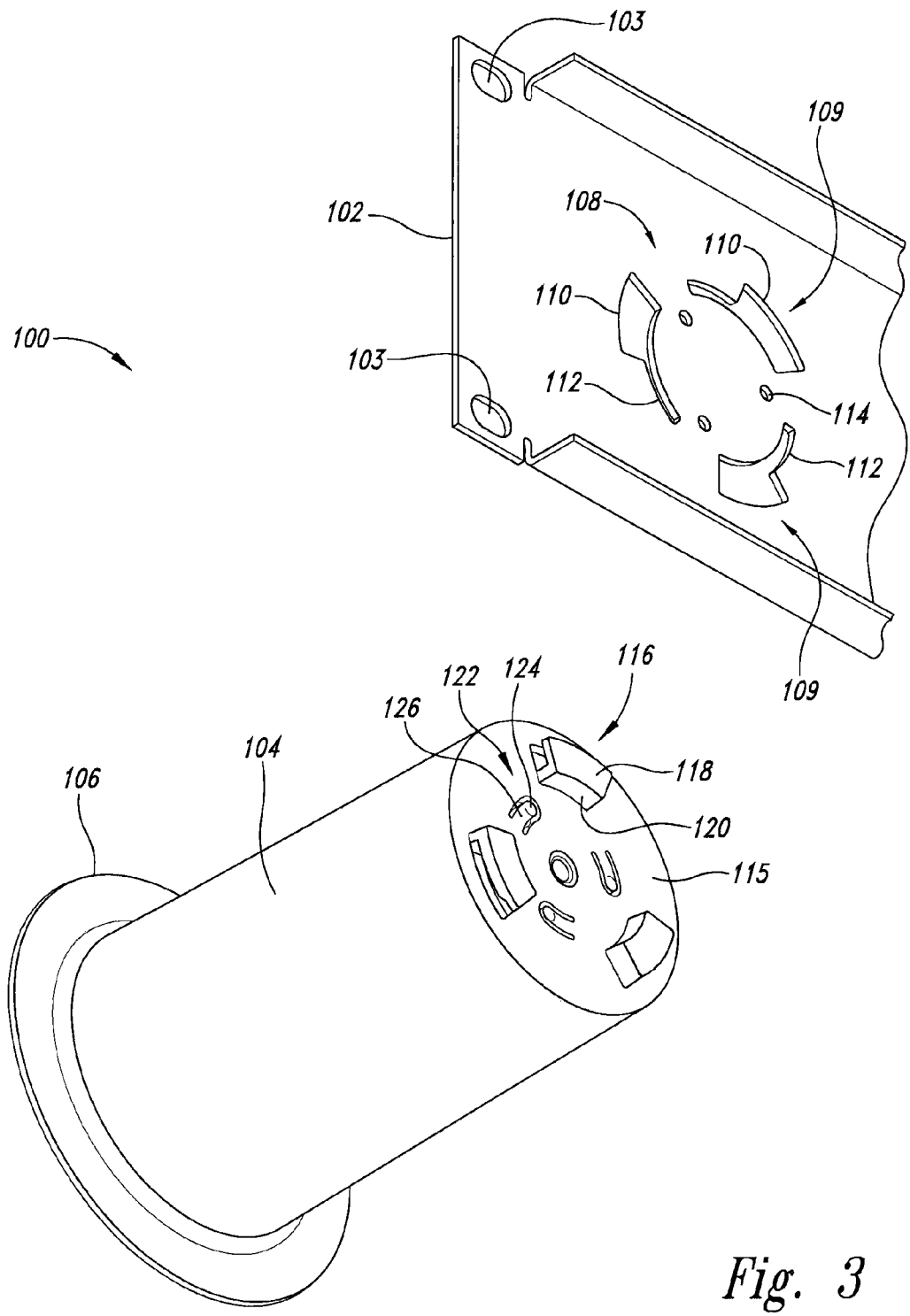
FIG. 3 is an enlarged, rear fragmentary isometric diagram of a portion of the cable slack manager system of FIG. 1 showing detail regarding mounting of one of the cable spools.

The cable spool 104 is shown in FIG. 3 has having a coupling end 115 that is placed adjacent the slack management panel 102 when the cable spool is coupled to the slack management panel. The coupling end 115 has a plurality of projections 116 positioned and in a number to match the position and number of slots 109 of one of the coupling locations 108 of the slack management panel 102. Each of the projections 116 has a retainment portion 118 and a key portion 120.

Figure 4:
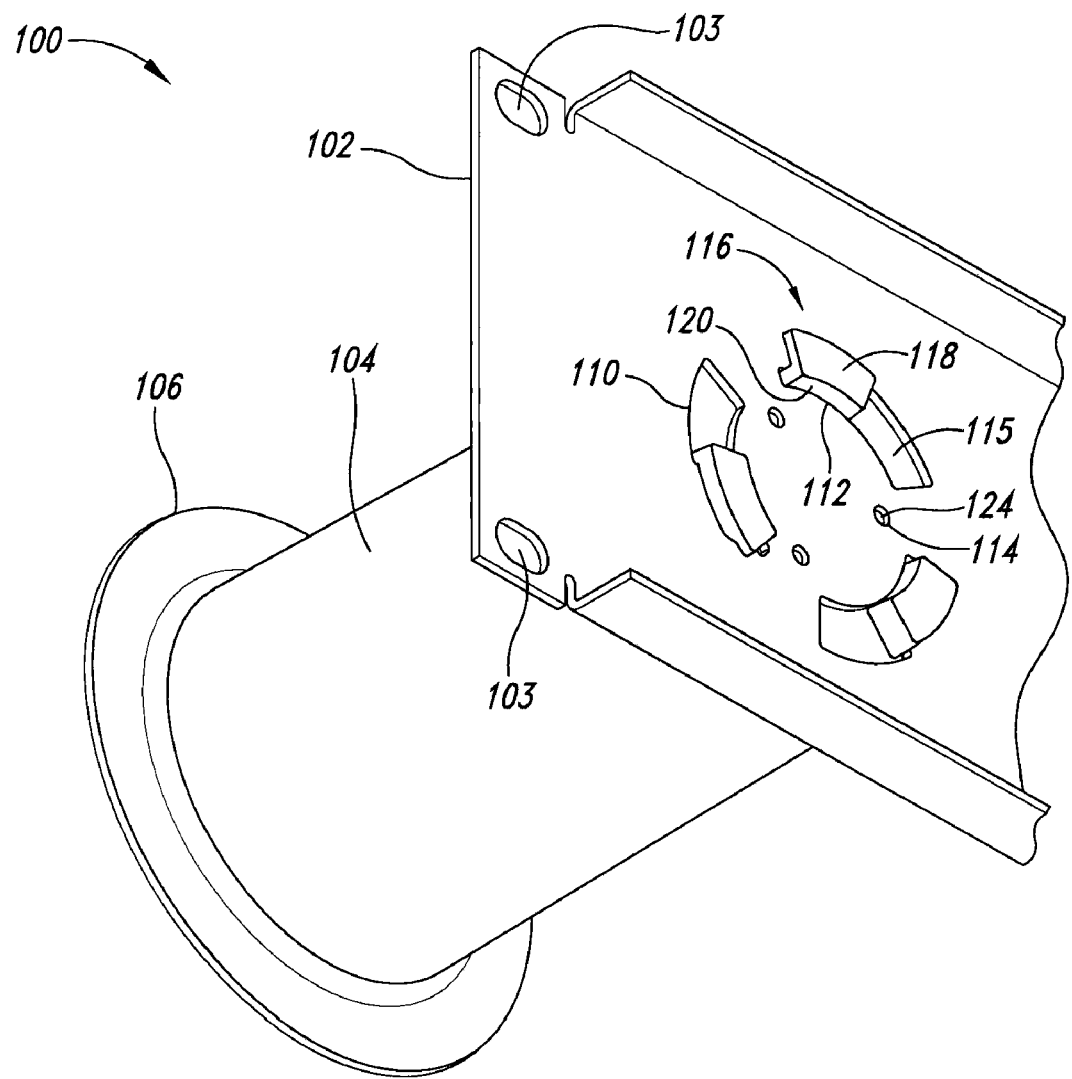
FIG. 4 is an enlarged, rear fragmentary isometric diagram of the portion of the cable slack manager system of FIG. 3 showing the mounted cable spool.

To attach the cable spool 104 to the slack management panel 102, the cable spool is aligned with the slack management panel so that the retainment portions 118 of the projections 116 are aligned with the receiving portions 110 of the slots 109. The cable spool 104 is then pushed against the slack management panel 102 so that the retainment portions 118 of the projections 116 go through their respective receiving portions 110 of the slots 109. The cable spool 104 is then rotated into a coupled position shown in FIG. 4 so that the key portions 120 of the projections 116 slide into their respective coupling portions 112 of the slots 109 and so that the retainment portions 118 of the projections 116 prevent the cable spool 104 from moving away from the slack management panel 102.

For each of the projections 116, the coupling end 115 of the cable spool 104 further includes an engagement member 122. Each engagement member 122 has a raised nub portion 124 and a leaf spring portion 126. As the cable spool 104 is fully rotated so that the key portions 120 of the projections 116 are fully engage in the respective coupling portions 112 of the slots 109, the nub portions 124 are centered over their respective holes 114 in the coupling end 115 so that the nub portions partially enter the holes to releasably secure engagement of the cable spool 104 with the slack management panel 102. The leaf springs 126 provide a force to maintain the engagement of the nub portions 124 with the holes 114. The amount of force supplied by the leaf springs 126 is typically sufficient to prevent the cable spools 104 from inadvertently rotating and uncoupling from the coupling locations 109, however, the force supplied by the leaf springs is not so large as to prevent the cable spools from being manually removed from the slack management panel 102 when desired.

Figure 5:
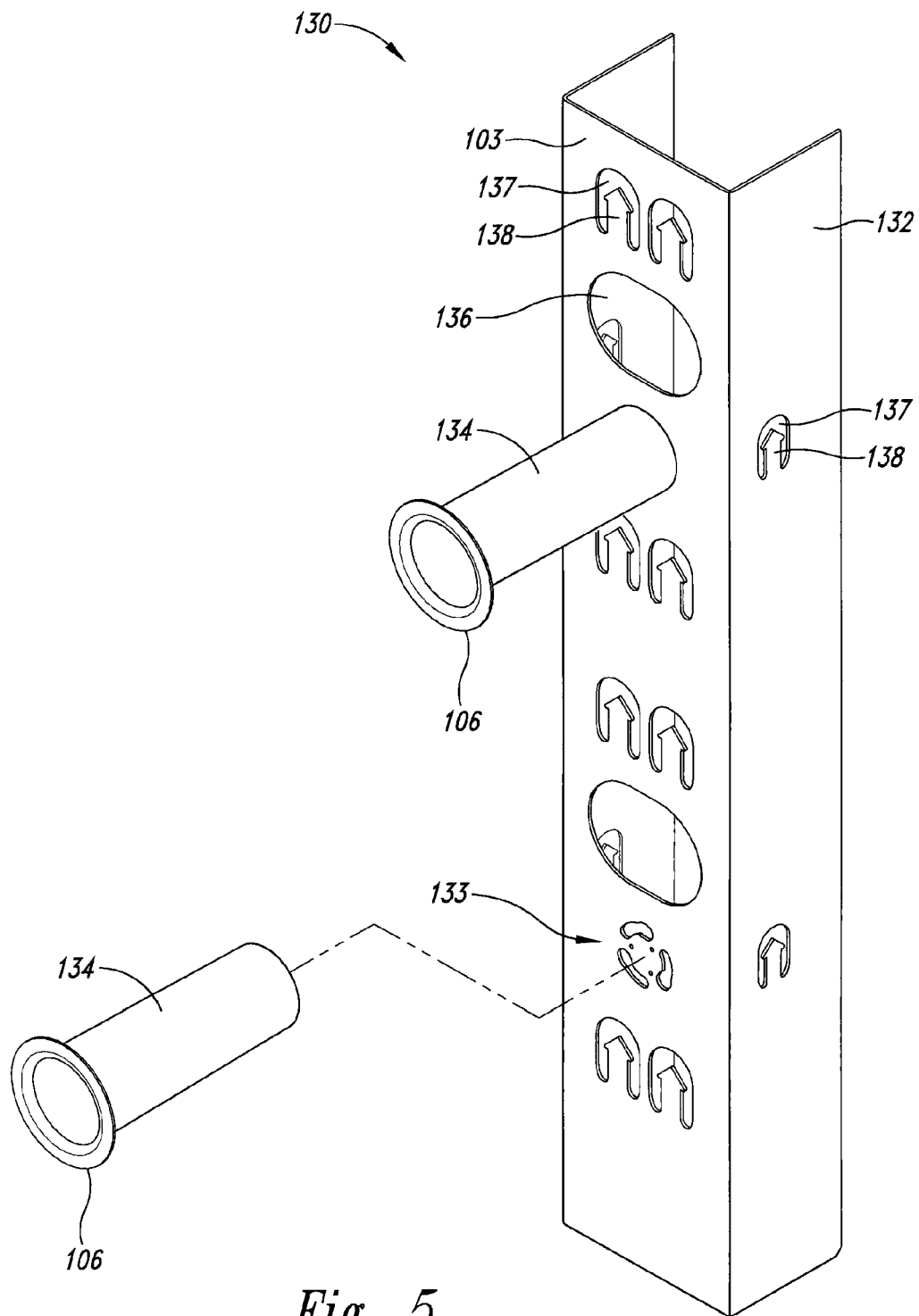
FIG. 5 is an isometric diagram of an alternative implementation of the cable slack manager system.
Figure 6:
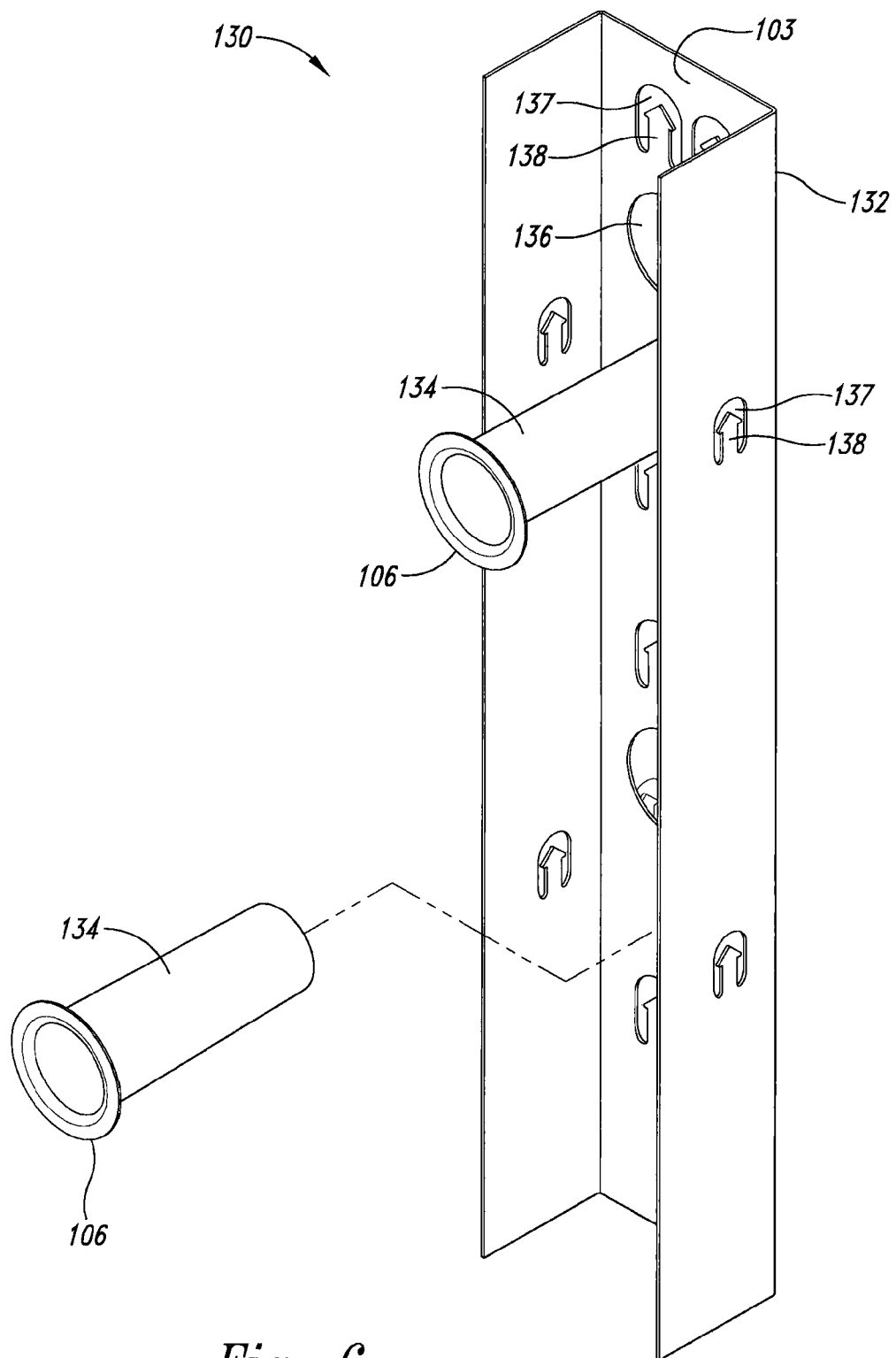
FIG. 6 is an isometric diagram of the alternative implementation of the cable slack manager system of FIG. 5 showing an opposing side.
Figure 7:
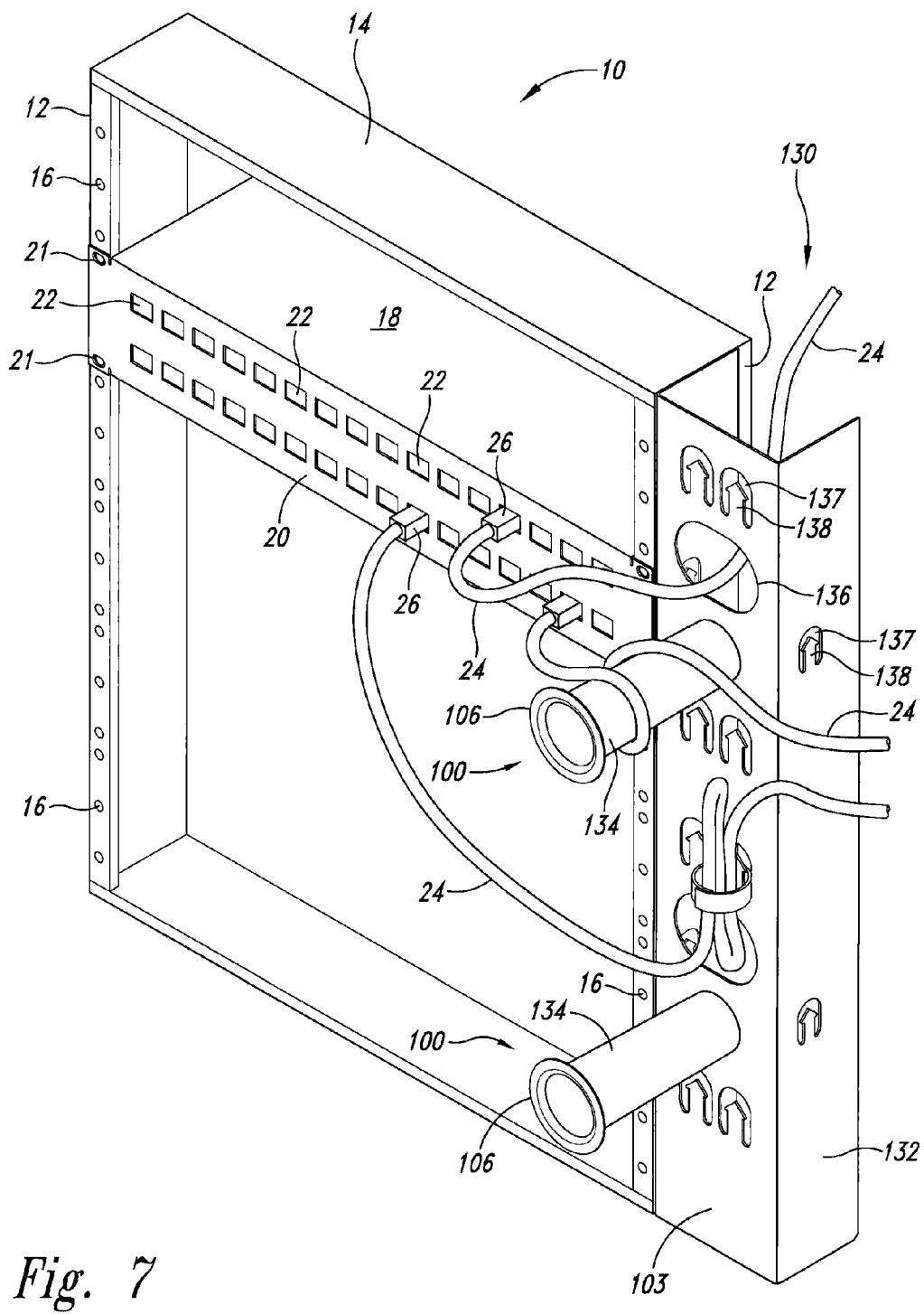
FIG. 7 is an isometric diagram of the alternative implementation of the cable slack manager system of FIG. 5 connected to a conventional rack.

A vertical implementation of the cable slack management system 130 is shown in FIG. 5 as having a vertical channel 132 with a slack management panel 103. The slack management panel 103 of the vertical channel 132 has coupling locations 133 configured and positioned so that cable spools 134 with projections 146 of the coupling and 115 thereof (shown in FIG. 8) can be attached on either side of the vertical channel slack management panel as depicted in FIGS. 5 and 6. The slack management panel 103 of the vertical channel 132 also can include access holes 136 and retaining openings 137 with spears 138 for routing and hanging of the cables 24 as shown in FIG. 7. Typically, the vertical channel 132 is attached to the vertical member 12 of the rack 10 also shown in FIG. 7.

Figure 8:
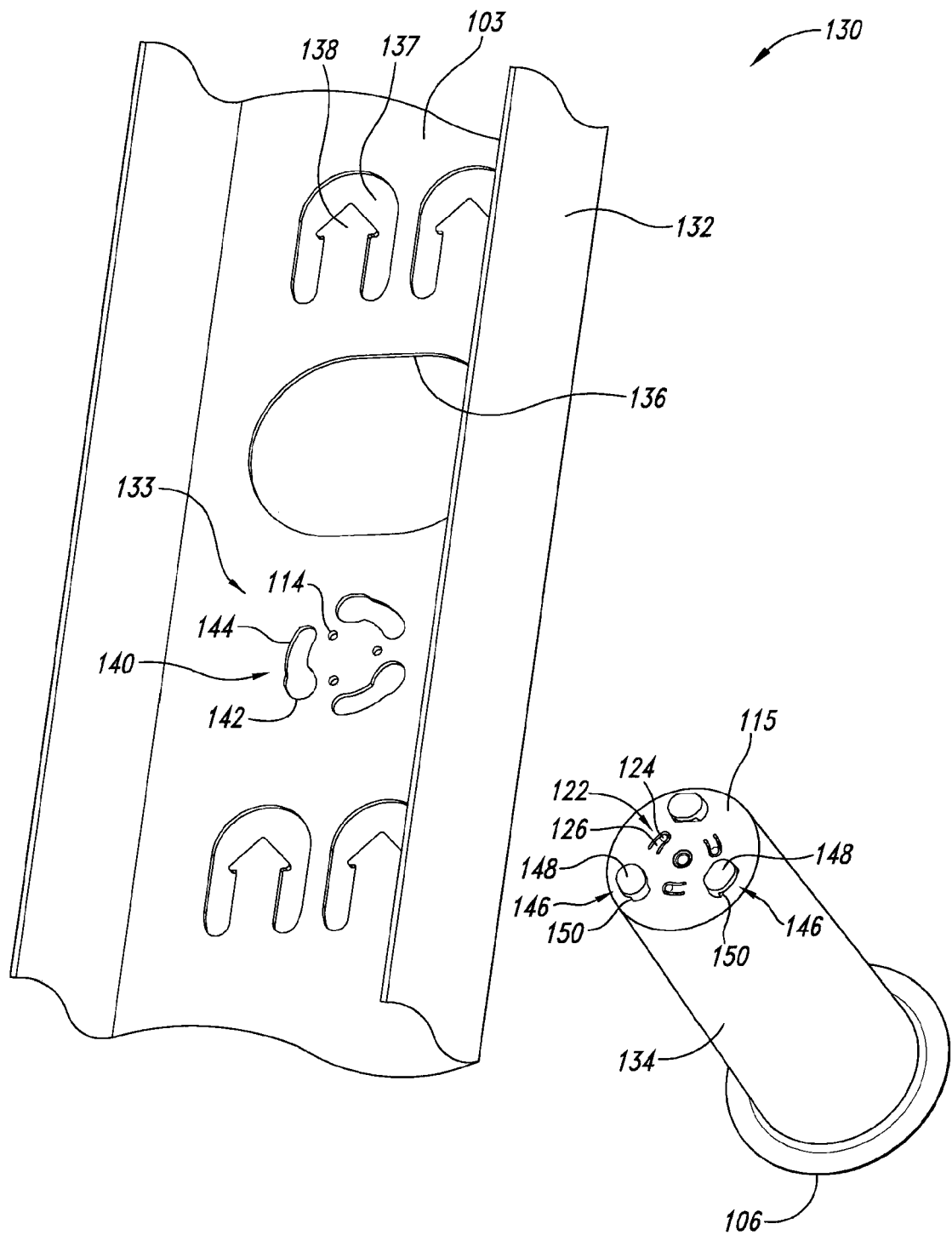
FIG. 8 is an enlarged, rear fragmentary isometric diagram of a portion of the cable slack manager system of FIG. 5 further showing detail regarding mounting of one of the cable spools.

In order for the cable spool 134 to be attached to either side of the coupling location 133 of the slack management panel 103 of the vertical channel 132, the coupling location has slots 140, each with a receiving portion 142 and a coupling portion 144 as shown in FIG. 8. The coupling portion 144 is positioned and shaped somewhat symmetrically relative to the receiving portion 142 as compared with the slot 108 having the coupling portion 112 which are substantially asymmetrically positioned relative to the receiving portion 110. The coupling end 115 of the cable spool 134 has projections 146, each with a retainment portion 148 and a key portion 150 shaped according to the slot 140 to perform engagement with the slack management panel 103 of the vertical channel 132 similar to that described for engagement of the cable spool 104 with the horizontal slack management panel 102 except, as mentioned, the cable spool 134 can engage with either side of the coupling location 133 of the vertical channel slack management panel.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiments, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

The invention claimed is:

1. A system for a component rack having opposing spaced apart upright members, a first component and a second component each being coupled to and extending laterally between the upright members, the first component being coupled to the upright members at a location spaced from the second component, the system comprising:
   a panel couplable to at least one of the upright members at a location adjacent the first component and the second component, the panel having a plurality of coupling locations each having a plurality of keyways arranged in a first circular pattern and a plurality of nub receiving areas arranged in a second circular pattern, each of the plurality of keyways having a coupling portion adjacent a receiving portion; and
   a plurality of elongated members configured to be coupled to selected ones of the plurality of coupling locations of the panel, each of the plurality of elongated members comprising a plurality of key portions receivable inside the receiving portions of the plurality of keyways of a selected coupling location, when so received, the plurality of key portions being rotatable from the receiving portions to the coupling portions whereat the plurality of key portions are operable to couple the elongated member to the panel, each of the plurality of elongated members further comprising a plurality of nubs receivable inside the plurality of nub receiving areas of the selected coupling location when the plurality of key portions are located inside the coupling portions of the plurality of keyways of the selected coupling location, each of the plurality of elongated members being configured to extend away from the panel when coupled to one of the plurality of coupling locations of the panel.

2. The system of claim 1 wherein the panel has a first side and a second side facing in a direction opposite the first side,
   each of the plurality of coupling locations is accessible from both the first side and the second side, and
   the plurality of elongated members are configured to be coupled to selected ones of the plurality of coupling locations along either the first side or the second side of the panel.

3. The system of claim 2 wherein each of a first portion of the plurality of elongated members are coupled to one of the plurality of coupling locations along the first side of the panel, and
   each of a second portion of the plurality of elongated members is coupled to one of the plurality of coupling locations along the second side of the panel.

4. The system of claim 1 wherein each of the plurality of elongated members has a cylindrical portion, the cylindrical portion extending away from the panel when the elongated member is coupled to one of the plurality of coupling locations of the panel.

5. The system of claim 1, wherein the panel is couplable to the upright members between the first component and the second component to extend laterally between the upright members.

6. The system of claim 1 for use with a cable coupled to at least one of the first component and the second component, wherein the panel further comprises at least one upright retention member configured to be tethered to the cable by a cable tie.

7. The system of claim 6, wherein the at least one upright retention member comprises an upright spear disposed inside a cutout portion, the upright spear being configured to be tethered to the cable by the cable tie and the cutout portion being configured to receive at least a portion of the cable tie tethered to the spear.

8. For a component rack having opposing vertical members to receive components therebetween, a system comprising:
   a panel couplable to at least one of the vertical members, the panel having a plurality of coupling locations, each coupling location having a plurality of slots arranged in a first circle having a circumference within the coupling location, the plurality of slots being spaced apart from one another along the circumference of the first circle, each slot having a receiving portion having a first width and a coupling portion having a second width, the first width being greater than the second width, each of the plurality of coupling locations of the panel further comprising a plurality of apertures arranged in a second circle having a circumference, the second circle being concentric with the first circle, the plurality of apertures being spaced apart from one another along the circumference of the second circle; and
   a plurality of cable spools, each cable spool having an end, the end having a surface and a plurality of projections extending from the surface and arranged in a third circle, each projection having a retainment portion having a first thickness greater than the second width and smaller than the first width, each projection having a key portion having a second thickness smaller than the second width, the key portion being closer to the surface than the retainment portion, for each coupling location, the surface of each of the plurality of cable spools further comprising a plurality of nubs arranged in a fourth circle having a circumference, the fourth circle being concentric with the third circle, the plurality of nubs being spaced apart from one another along the circumference of the fourth circle, and
   for each of the plurality of cable spools:
   the receiving portions of the plurality of slots being positioned to receive the retainment portions of the plurality of projections of the cable spool,
   the plurality of nubs being located outside the plurality of apertures when the plurality of projections is received inside the retainment portions,
   after being received inside the retainment portions, the plurality of projections being rotatable within the plurality of slots to position the key portions of the plurality of projections inside the coupling portions of the plurality of slots and the plurality of nubs inside the plurality of apertures,
   the retainment portions of the plurality of projections being configured to prevent disengagement of the cable spool from the panel when the key portions are positioned inside the coupling portions, and
   the plurality of nubs being configured to resist rotation of the cable spool relative to the panel when the plurality of nubs is positioned inside the plurality of apertures.

9. The system of claim 8, wherein each of the plurality of spaced apart nubs of each of the plurality of cable spools comprises a biasing member, the biasing members of the plurality of nubs being configured to urge the plurality of nubs into the plurality of apertures.

10. The system of claim 8, wherein the second circle is inside the first circle.

11. For a component rack having opposing vertical members to receive components therebetween, a system comprising:
- a panel couplable to at least one of the vertical members, the panel having a plurality of coupling locations, each coupling location having a plurality of slots and a plurality of holes; and
- a plurality of elongated members, each member having an end, the end having a surface, a plurality of nubs extending from the surface, and a plurality of projections extending from the surface, each nub sized to at least partially fit into one of the plurality of holes of a selected one of the plurality of coupling locations of the panel,
- for each of the plurality of coupling locations, the plurality of slots being configured to receive the plurality of projections of one of the plurality of elongated members and allow the elongated member to be rotated within the plurality of slots to position the plurality of nubs at least partially inside ones of the plurality of holes.

12. The system of claim 11, wherein the surface of each of the plurality of elongated members comprises a first portion, the plurality of projections are spaced from and arranged about the first portion, and the plurality of nubs are spaced from and arranged about the first portion.

13. The system of claim 12, wherein for each of the plurality of elongated members, the plurality of projections are arranged in a first circle having a center in the first portion, and the plurality of nubs are arranged in a second circle concentric with the first circle.

14. The system of claim 13, wherein the second circle is inside the first circle.

15. The system of claim 11, wherein each of the plurality of elongated members comprises a portion configured to extend away from the panel when the plurality of projections of the elongated member are received inside the plurality of slots of one of the plurality of coupling locations.

16. The system of claim 15, wherein the portion configured to extend away from the panel when the plurality of projections of the elongated member are received inside the plurality of slots of one of the plurality of coupling locations has a cylindrical shape.

17. For a component rack, a system comprising:
- a panel couplable to the rack, the panel having a coupling location with a plurality of apertures, and a plurality of slots, each slot having a receiving portion and an engagement portion; and
- an elongated member extending from a coupling end along a longitudinal axis, the coupling end having a central portion, a plurality of projections spaced apart from the central portion, and a plurality of nubs spaced apart from the central portion, each projection shaped, sized, and positioned on the coupling end to be inserted into the receiving portion of a different one of the slots of the coupling location, each of the slots oriented to allow for movement of the projection inserted therein from the receiving portion to the engagement portion of the slot by a rotational movement of the elongated member about the longitudinal axis to couple each of the projections with the engagement portion, thereby coupling the elongated member to the panel, and positioning each of the plurality of nubs of the elongated member into engagement with the plurality of apertures of the coupling location.

18. The component rack of claim 17, wherein for each of the plurality of elongated members, each of the plurality of nubs are affixed to the coupling end of the elongated member by a leaf spring.

19. The component rack of claim 17 wherein the elongated member is a cylinder.

20. The component rack of claim 19 wherein the elongated member is a cable spool.

21. A component rack for use with components each comprising a cable, the component rack comprising:
- a frame defining an interior, the frame comprising a first upright member and a second upright member, the frame being configured to receive components inside its interior that are couplable to the first and second upright members;
- a panel having a plurality of coupling locations, each coupling location having a plurality of slots, each slot having a receiving portion having a first width and a coupling portion having a second width, the first width being greater than the second width; and
- a plurality of members, each member having a cable receiving portion extending away from the end, the cable receiving portion being configured to have a cable of a component received inside the interior of the frame wrapped about the cable receiving portion, each of the plurality of members further comprising an end having a surface and a plurality of projections extending from the surface, each projection having a retainment portion having a first thickness greater than the second width and smaller than the first width, each projection having a key portion having a second thickness smaller than the second width, the key portion being closer to the surface than the retainment portion, for each coupling location, the plurality of slots being positioned to receive the retainment portions of the projections of one of the plurality of members, after being received inside the retainment portions, the projections of the one of the plurality of members being rotatable within the plurality of slots to position the key portions of the projections inside the coupling portions of the plurality of slots, and the retainment portions of the projections of the one of the plurality of members being configured to prevent disengagement of the one of the plurality of members from the panel when the key portions are positioned inside the coupling portions.

22. The component rack of claim 21, wherein each of the plurality of coupling locations of the panel comprises a plurality of apertures,
- the surface of each of the plurality of members comprises a plurality of nubs,
- the plurality of nubs are located outside the plurality of apertures when the plurality of projections are received inside the retainment portions, and
- for each of the plurality of members, the plurality of projections are rotatable within the plurality of slots to position the plurality of nubs inside the plurality of apertures, the plurality of nubs being configured to resist rotation of the member relative to the panel when the plurality of nubs are positioned inside the plurality of apertures.

23. The component rack of claim 22, wherein each of the plurality of spaced apart nubs of each of the plurality of members comprises a biasing member, the biasing members of the plurality of nubs being configured to urge the plurality of nubs into the plurality of apertures.

24. The component rack of claim 21, wherein the panel is coupled to the first and second upright members outside the interior of the frame.

25. A component rack comprising:
a panel having a plurality of coupling locations; and
a plurality of elongated members, each member having a coupling end,
each of the coupling locations having one of a plurality of holes or a plurality of nubs formed therein,
each of the coupling ends having the other of the plurality of holes or the plurality of nubs formed therein,
each of the coupling locations further having one of a plurality of slots or a plurality of projections formed therein,
each of the coupling ends further having the other of the plurality of slots or the plurality of projections formed therein,
the plurality of slots being configured to receive the plurality of projections and allow the plurality of projections to be rotated within the plurality of slots to position the plurality of nubs at least partially inside the plurality of holes.

26. For a component rack, a system comprising:
a panel couplable to the rack, the panel having a plurality of slots, each of the slots having a receiving portion and an engagement portion; and
a first elongated member extending from a coupling end along a longitudinal axis, the coupling end having a plurality of projections spaced apart from a central portion of the coupling end, each of the plurality of projections of the first elongated member being shaped, sized, and positioned on the coupling end of the first elongated member to be inserted into the receiving portion of a different one of the plurality of slots, each of the slots oriented to allow for movement of the projection inserted therein from the receiving portion to the engagement portion of the slot by a rotational movement of the elongated member about the longitudinal axis to couple each of the projections with the engagement portion and thereby couple the elongated member to the panel,
the coupling end of the first elongated member further having a plurality of nubs spaced apart from a central portion of the coupling end and the panel having a plurality of holes, each of the plurality of nubs being sized to engage with one of the holes, each of the nubs being positioned on the coupling end of the first elongated member to engage with a different one of the plurality of holes of the panel when the projections are coupled with engagement portions on the panel.

27. The component rack of claim 26, wherein the panel has a first side and a second side, the second side being reverse of the first side, the plurality of slots are located on the first side and the second side of the panel,
the plurality of projections of the first elongated member are shaped, sized, and positioned on the coupling end to couple the coupling end to the panel on a selected one of the first side and the second side by insertion of each projection into a different one of the slots and thereby couple the elongated member to the selected one of the first side and the second side of the panel.

28. The component rack of claim 27, wherein the plurality of slots of the panel define a first coupling location, and the panel further comprises a second coupling location with a plurality of slots on the first side and the second side of the panel, each of the slots having a receiving portion and an engagement portion, the component rack further comprising:
a second elongated member extending from a coupling end along a longitudinal axis, the coupling end having a plurality of projections spaced apart from a central portion of the coupling end, the plurality of projections of the second elongated member being shaped, sized, and positioned on the coupling end of the second elongated member to be inserted into the receiving portion of a different one of the plurality of slots of the second coupling location on a selected one of the first side and the second side, each of the slots oriented to allow for movement of the projection inserted therein from the receiving portion to the engagement portion of the slot by a rotational movement of the second elongated member about the longitudinal axis to couple each of the projections with the engagement portion and thereby couple the second elongated member to the panel.

29. The component rack of claim 28, wherein the coupling end of the second elongated member further comprises a plurality of nubs spaced apart from a central portion of the coupling end,
the second coupling location of the panel has a plurality of holes,
each of the plurality of nubs being sized to engage with one of the holes,
each of the nubs being positioned on the coupling end of the second elongated member to engage with a different one of the plurality of holes of the second coupling location when the plurality of projections of the second elongated member are coupled with the engagement portions of the plurality of slots of the second coupling location of the panel.

30. The system of claim 26 for use with a component rack having spaced apart vertical members to receive a component coupled to a cable therebetween, wherein the panel further comprises:
a cutout portion; and
a retention member extending partially across the cutout portion, the retention member being tetherable to the cable by a cable tie.

31. The system of claim 26 for use with a component rack having spaced apart vertical members to receive a component having a cable therebetween, wherein the panel has a first side and a second side facing in a direction opposite the first side, and the system further comprises:
a channel adjacent the second side of the panel configured to provide a passageway for the cable.

32. A method comprising:
coupling a panel having a first side, a second side opposite the first side, and a plurality of coupling locations to a rack, the plurality of coupling locations being accessible from both the first side and the second side of the panel, each of the plurality of coupling locations having a plurality of slots and a plurality of holes, each of the slots having a receiving portion and an engagement portion;
selecting a first coupling location from the plurality of coupling locations of the panel;
coupling a first elongated member to the first coupling location on the first side of the panel, the first elongated member extending along a longitudinal axis from a coupling end comprising a central portion, a plurality of projections spaced apart from the central portion, and plurality of nubs spaced apart from the central portion, coupling the first elongated member to the first coupling location on the first side of the panel further comprising inserting each of the plurality of projections of the coupling end of the first elongated member into the receiving portion of a different one of the plurality of slots of the first coupling location on the first side of the panel thereby positioning the plurality of nubs adjacent to the first side of the panel, and rotating the first elongated member about its longitudinal axis to rotate the plurality of projections from the receiving portions into the engagement portions of the plurality of slots of the first coupling location and position each of the plurality of nubs inside a different one of the plurality of holes of the first coupling location;

selecting a second coupling location from the plurality of coupling locations of the panel; and coupling a second elongated member to the second coupling location on the second side of the panel, the second elongated member extending along a longitudinal axis from a coupling end comprising a central portion, a plurality of projections spaced apart from the central portion, and plurality of nubs spaced apart from the central portion, coupling the second elongated member to the second coupling location on the second side of the panel further comprising inserting each of the plurality of projections of the coupling end of the second elongated member into the receiving portion of a different one of the plurality of slots of the second coupling location on the second side of the panel thereby positioning the plurality of nubs adjacent to the second side of the panel, and rotating the second elongated member about its longitudinal axis to rotate the plurality of projections from the receiving portions into the engagement portions of the plurality of slots of the second coupling location and positioning each of the plurality of nubs inside a different one of the plurality of holes of the second coupling location.

33. The method of claim 32, wherein the rack comprises a component having a cable, the panel comprises a cable retention member, and the method further comprises tethering the cable to the cable retention member.

34. The method of claim 33, wherein the cable retention member comprises a cutout portion, a spear extending partially across the cutout portion, and tethering the cable to the cable retention member comprises tying the cable to the spear with a cable tie.

* * * * *